United States Patent
Brandner et al.

(10) Patent No.: US 7,097,445 B2
(45) Date of Patent: Aug. 29, 2006

(54) METHOD AND APPARATUS FOR MAKING A BLOW MOLDED FUEL TANK

(75) Inventors: Brian W. Brandner, Kingsville (CA); Keith D. Kersey, Windsor (CA); Harald Knueppel, Belle River (CA); Christopher K. Quick, Windsor (CA)

(73) Assignee: TI Group Automotive Systems, L.L.C., Warren, MI (US)

( * ) Notice: Subject to any disclaimer, the term of this patent is extended or adjusted under 35 U.S.C. 154(b) by 155 days.

(21) Appl. No.: 10/653,783

(22) Filed: Sep. 3, 2003

(65) Prior Publication Data

US 2005/0046088 A1 Mar. 3, 2005

(51) Int. Cl.
*B29C 49/50* (2006.01)
*B29C 49/58* (2006.01)

(52) U.S. Cl. ..................... 425/527; 425/535

(58) Field of Classification Search ........... 425/525, 425/527, 532, 535; 264/534, 540, 536; B29C 49/50, B29C 49/58
See application file for complete search history.

(56) References Cited

U.S. PATENT DOCUMENTS

| | | | |
|---|---|---|---|
| 3,369,690 A * | 2/1968 | Thomas | 264/536 |
| 3,428,722 A * | 2/1969 | Chittenden et al. | 425/532 |
| 3,464,085 A * | 9/1969 | Burkett et al. | 425/532 |
| 3,592,885 A * | 7/1971 | Goins et al. | 425/527 |
| 3,897,670 A * | 8/1975 | Hansen | 425/532 |
| 4,176,153 A | 11/1979 | Weiler et al. | |
| 4,266,927 A * | 5/1981 | Gilbert et al. | 425/527 |
| 4,948,356 A * | 8/1990 | Dundas et al. | 425/522 |

FOREIGN PATENT DOCUMENTS

| | | |
|---|---|---|
| EP | 0 204 200 | 12/1986 |
| EP | 0 355 437 | 9/1990 |
| JP | 60049919 | 3/1985 |
| JP | 60049919 A * | 3/1985 |
| JP | 60135228 A * | 7/1985 |
| JP | 01011819 A * | 1/1989 |
| JP | 2000052413 A * | 2/2000 |

* cited by examiner

*Primary Examiner*—Robert B. Davis
(74) *Attorney, Agent, or Firm*—Reising, Ethington, Barnes, Kisselle, P.C.

(57) ABSTRACT

A fuel tank is formed by a blow molding apparatus and method wherein a blow pin provides pressurized gas into an interior of a parison received in a blow mold so the parison may be blown to shape within the mold cavity. When the blow pin is no longer needed, it is retracted from the mold and a pinch plate assembly is used to close off the opening in the molded part created by the blow pin. Thereafter, the mold may be opened and the molded part removed, the pinch plate assembly and moved back to its retracted position, and the blow mold pin may be advanced into the open mold for use with a subsequent parison so that the subsequent parison can be blow molded in the same manner.

12 Claims, 4 Drawing Sheets

METHOD AND APPARATUS FOR MAKING A BLOW MOLDED FUEL TANK

FIELD OF THE INVENTION

This invention relates to a method and apparatus for forming a fuel tank, and more particularly a blow molded fuel tank.

BACKGROUND OF THE INVENTION

Generally, in a blow molding process, a parison is extruded in a size and of an amount of material sufficient to create a desired part. The parison is placed into an open mold in which a blow pin may be oriented, and the mold is closed around the parison. Portions of the parison are pinched between halves of the mold as the mold is closed, and the parison is preferably received around the blow pin. A gas under pressure, such as air, is introduced into the interior of the parison through the blow pin to outwardly expand the parison into the mold and conform the parison to the shape of the mold cavity.

After the blowing procedure, the blow pin may be retracted from the mold and the molded part removed from the mold. Flashing is removed from the molded port at a trimming station, and other secondary finishing operations may be performed. A hole in the molded part where the blow pin was received is then closed with a plug or cover welded to the tank. A cover or plug welded over or in the opening may result in a gap in a barrier layer of the fuel tank thereby allowing increased emissions from the fuel tank. Also, there is a potential for failure in attaching the cover or plug to the fuel tank resulting in an increased scrap rate of fuel tanks produced by a blow molding operation.

SUMMARY OF THE INVENTION

A fuel tank is formed by a blow molding apparatus and method wherein a blow pin is communicated with an interior of a parison received in a blow mold so the parison may be blown to shape within the mold cavity by introduction of a pressurized gas from the blow pin into the interior of the parison. When the blow pin is no longer needed, it is retracted from the mold and a pinch plate assembly is used to close off the opening in the molded part created by the blow pin. The pinch plate assembly may also remove flash to reduce or eliminate downstream processing operations. Thereafter, the mold may be opened and the molded part removed, the pinch plate assembly moved back to its retracted position, and the blow pin may be advanced into the open mold for use with a subsequent parison so that a subsequent parison can be blow molded in the same manner.

The pinch plate assembly preferably includes two opposing plates having leading edges movable from an open position spaced from each other to a closed position pinching and sealing between them a portion of the parison or molded part. The above-outlined method and apparatus for blow molding a fuel tank creates a formed part without a hole created by a blow pin. In this manner, a fuel tank formed by the above outlined method does not need to be further processed in a finishing operation to seal or plug a hole formed in the part during the blow molding operation. Flash may also be removed from the formed tank to reduce or eliminate subsequent processing operations.

BRIEF DESCRIPTION OF THE DRAWINGS

These and other objects, features and advantages of the present invention will be apparent from the following detailed description of the preferred embodiments, appended claims and accompanying drawings in which:

DETAILED DESCRIPTION OF THE PREFERRED EMBODIMENTS

Figure 1:
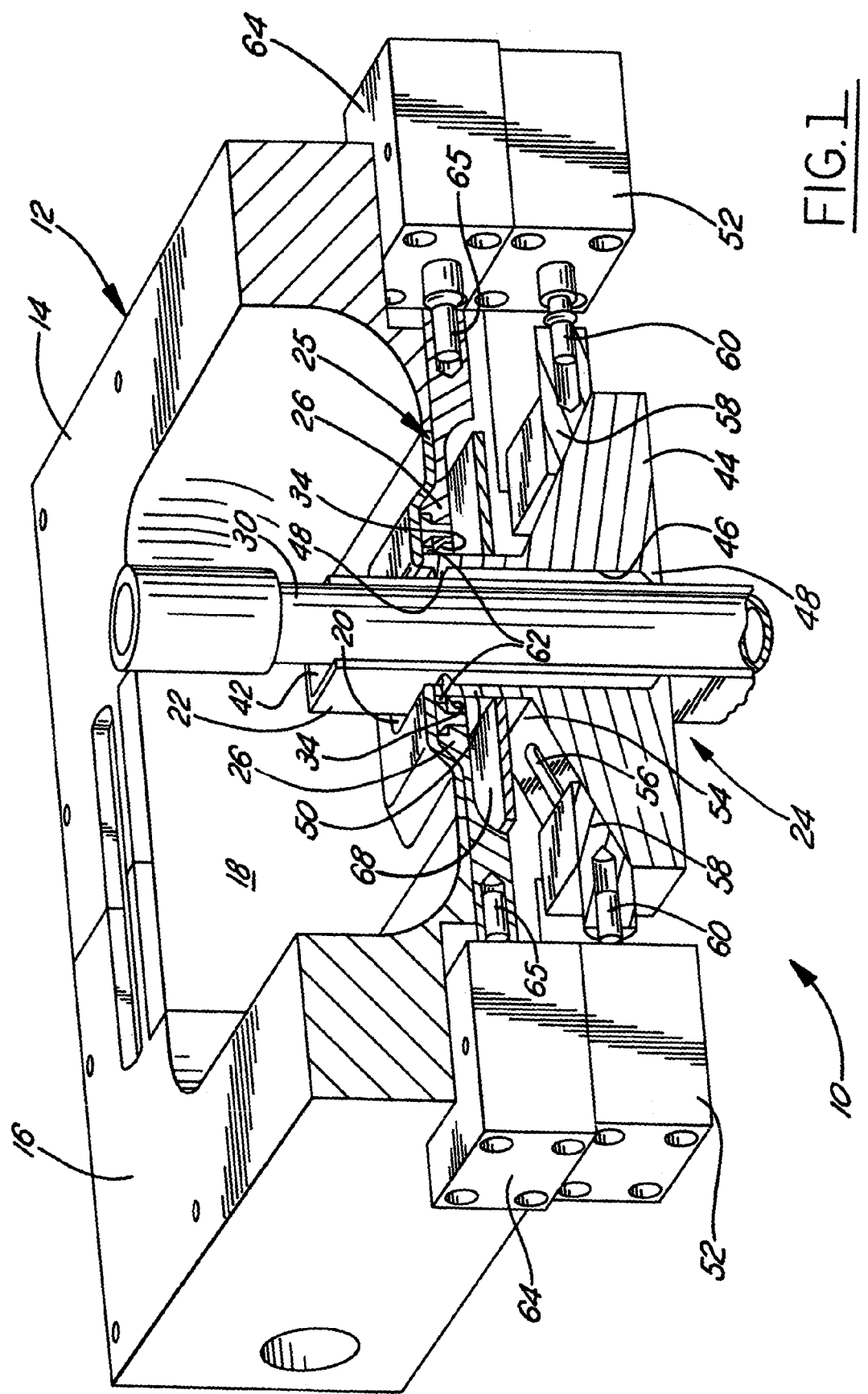
FIG. 1 is a fragmentary perspective sectional view of a portion of a blow molding apparatus according to one presently preferred embodiment of the invention including a blow pin assembly shown in its extended position.

Referring in more detail to the drawings, FIG. 1 illustrates a blow molding apparatus 10 according to one presently preferred embodiment of the invention. The blow molding apparatus 10 includes a mold 12 having a pair of mold halves 14, 16 (only partially shown in FIGS. 1 and 3) which may be moved between open and closed positions to receive a parison and to enable the parison to be blow molded, respectively. The mold halves 14, 16 define a mold cavity 18 in which the parison is received and formed into its final shape. An opening 20 in the mold 12 receives a blow pin 22 of a blow pin assembly 24 that provides pressurized gas, such as air, into an interior of a parison to expand it outwardly into the mold cavity 18. A pinch plate assembly 25 includes a pair of pinch plates 26 moveable between an open position (shown in FIG. 1) wherein the pinch plates 26 are spaced from each other and a closed position (FIGS. 3 and 4) wherein the pinch plates preferably engage and pinch closed a portion of the fuel tank material as will be discussed in more detail below. In FIG. 1, the pinch plates 26 are shown in their open position and the blow pin 22 is shown in its extended position received between the pinch plates 26 and through the opening 20 to the mold cavity 18.

A carrier arm 30 may also be received through the opening 20, and as shown, extends through the blow pin 22 so that it also communicates with an interior of the parison. One or more components received on the carrier 30 are disposed within the interior of the parison so that they are disposed inside the formed or molded fuel tank, eliminating the need for subsequent insertion of the components into the fuel tank, and potentially reducing the number of openings required in the fuel tank.

To form a blow molded fuel tank, a parison of fuel tank material is located between the open halves 14, 16 of the mold 12 and preferably over the blow pin 22 and carrier arm 30. The mold halves 14, 16 are then closed, preferably pinching desired portions of the parison and also closing the parison around the blow pin 22. Pressurized air is introduced from the blow pin 22 into the interior of the parison to expand the parison outwardly into engagement with the mold 12 in the mold cavity 18 and form the parison into its desired final shape. When the blowing operation is finished, the blow pin 22 and carrier arm 30 can be retracted leaving behind whatever components were on the carrier arm 30 within the interior of the blow molded fuel tank.

Figure 4:
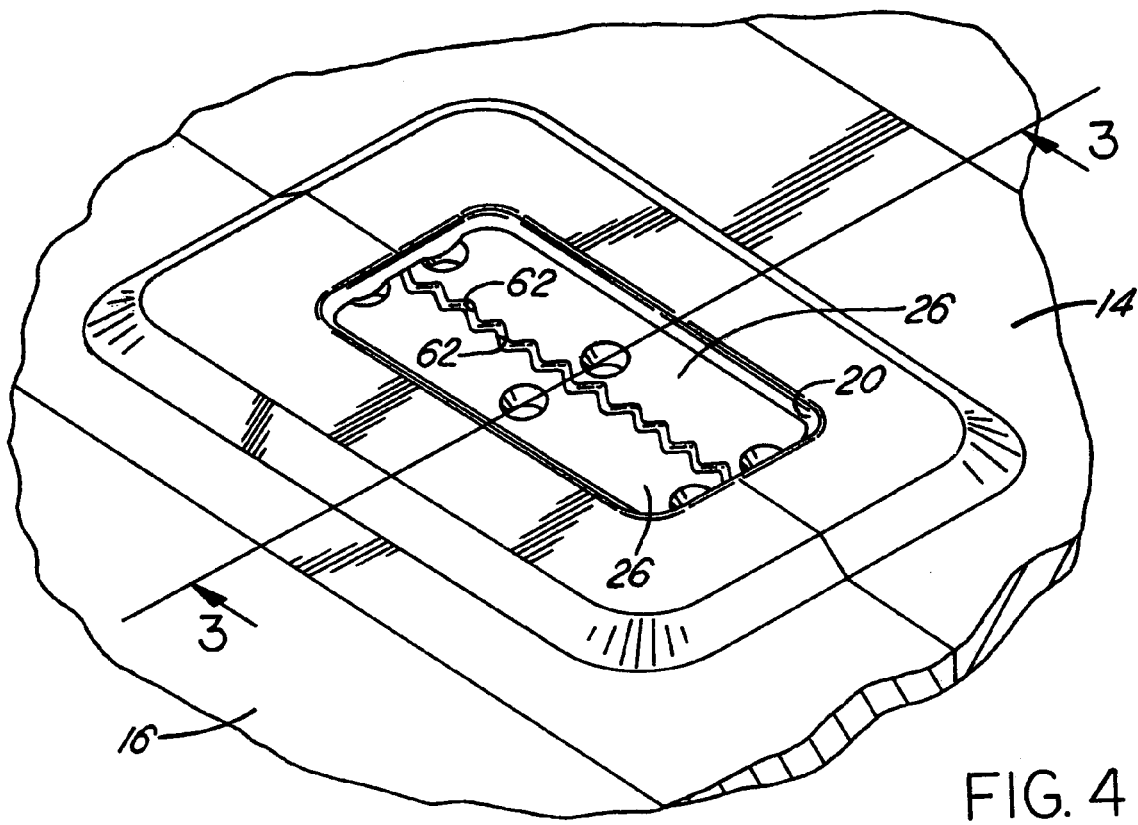
FIG. 4 is a fragmentary perspective view showing pinch plates of the pinch plate assembly in their closed position.
Figure 3:
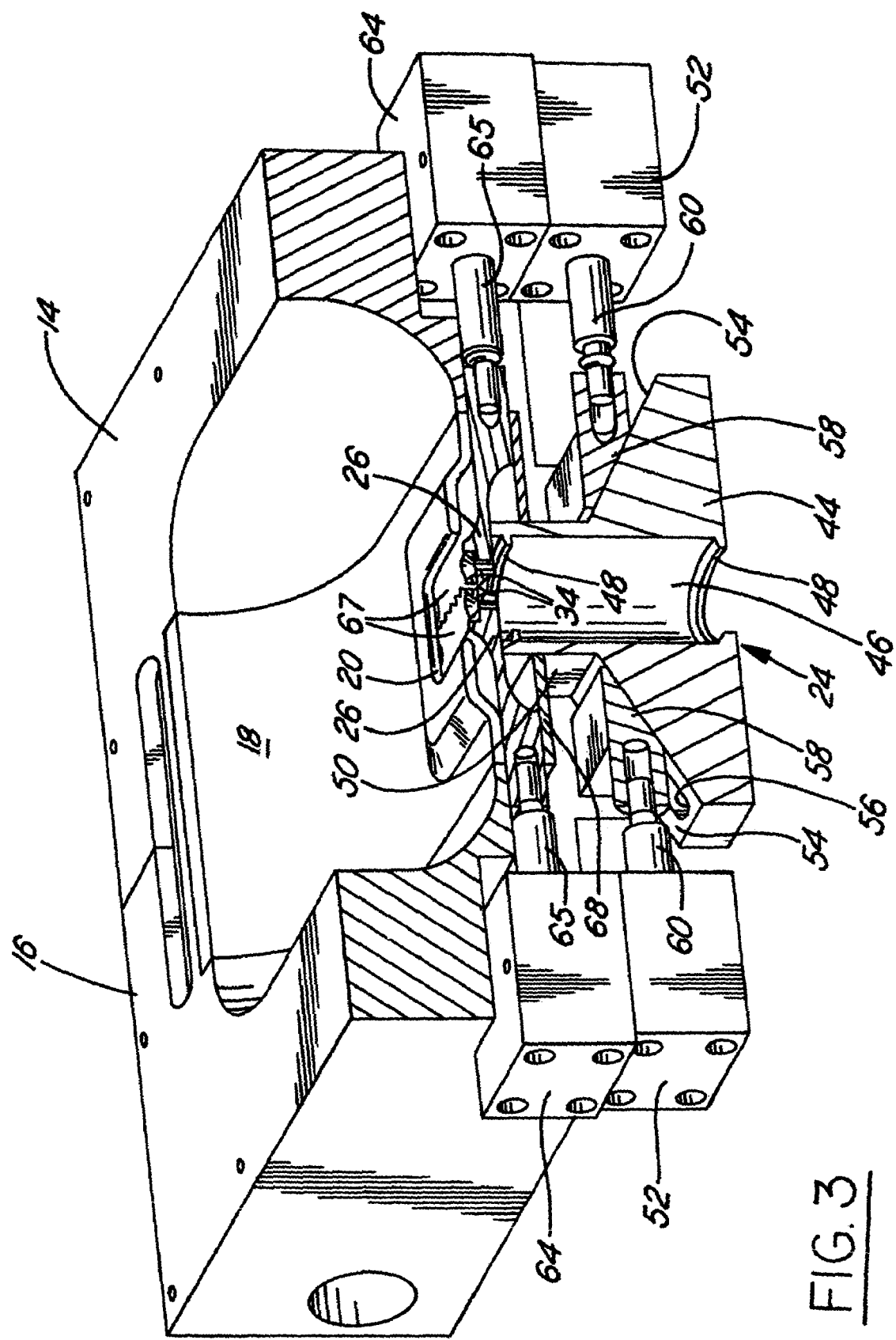
FIG. 3 is a sectional view of the apparatus showing a pinch plate assembly in its closed position.

With the blow pin 22 removed from the mold 12, the pinch plate assembly 25 is moved to its second position moving the pinch plates 26 to their closed position shown in FIGS. 3 and 4. When the pinch plates 26 close, they preferably engage the parison or fuel tank material around the opening left by the blow pin 22, and pinch and seal it to close the opening left by the blow pin 22. Opposed trim blades 34 may be provided below the pinch plates 26 to further pinch material and facilitate its removal, or cut or shear and remove flashing from the seam created by the pinch plates 26. Thereafter, the mold halves 14, 16 are opened and the formed fuel tank can be removed from the mold 12. To prepare for forming a subsequent fuel tank, the pinch plate assembly is retracted to its open position removing the pinch plates 26 from the area of the opening 20, and the blow pin 22 is extended into the mold cavity 16 resetting the apparatus 10 to the arrangement generally shown in FIG. 1 for molding a subsequent fuel tank.

Figure 2:
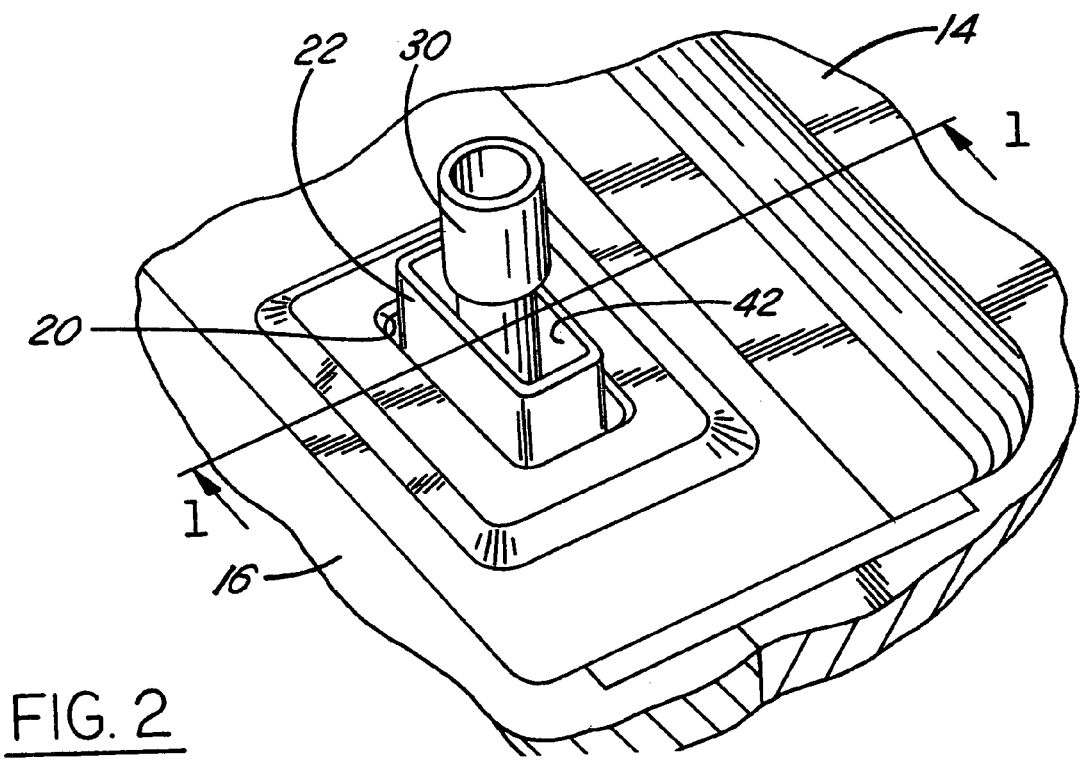
FIG. 2 is a fragmentary perspective view showing the blow pin assembly of the apparatus of FIG. 1.

Referring to FIGS. 1 and 2, the blow pin assembly 24 includes the blow pin 22 itself which is shown having a generally rectangular shape with a central passage 42 through which the carrier arm 30 is received and pressurized air flows during the blow molding operation. The blow pin 22 is slidably received for reciprocation between extended and retracted positions within a blow pin guide 44 having a passage 46 and inwardly extending flanges 48 which help locate the blow pin 22. The blow pin guide 44 is moveable between first and second positions, and is shown in FIG. 1 in its first position wherein a neck 50 of the guide 44 is engaged with a lower portion of the mold 12 surrounding the opening 20. In this position, the neck 50 is received between the pinch plates 26 and prevents inadvertent actuation of the pinch plates 26 towards their closed position at least when the blow pin 22 is within the opening 20. In FIG. 3 the blow pin guide 44 is shown in its second position where the neck 50 is spaced from the mold 12 and the opening 20 so that the guide 44 is out of the way of the pinch plate assembly 25.

The blow pin guide 44 is preferably yieldably biased to its first position, as shown in FIG. 1, and is moved to its second position, as shown in FIG. 3, by at least one actuator 52, and preferably a pair of actuators 52. In the embodiment shown, the blow pin guide 44 has inclined ramp surfaces 54 with a slot 56 or keyway formed in each ramp surface 54. The slot 56 or keyway cooperates with a key (not shown) carried by a block 58 driven for slidable movement along the ramp surface 54 by an arm 60 of an actuator 52. As shown, the apparatus has two actuators 52, preferably pneumatic or hydraulic cylinders or servo controlled motors, each having an arm 60 associated with a separate block 58 received on a corresponding ramp surface 54. As shown in FIG. 1 the blocks 58 are initially at the outer portion of the slots 56 near the lower end of the ramp surfaces 54, and are driven linearly forward towards the neck 50 by the actuator 52, moving the blocks 58 along the ramp surfaces 54 and providing a force moving the blow pin guide 44 downwardly away from the opening 20 to its second position. To permit the blow pin guide 44 to return to its extended position, the actuators 52 retract the blocks 58 moving them away from the neck 50 into their position shown in FIG. 1. Hence, through use of the ramp surfaces 54 and blocks 58 linear reciprocation of the arms 60 causes linear movement of the blow pin guide 44 in a path perpendicular to the movement of the arm.

The pinch plate assembly 25 preferably includes a pair of pinch plates 26 having generally opposed leading faces 62 between which a portion of the parison may be pinched to close and seal off an opening created by the blow pin 22. Each pinch plate 26 is preferably associated with a separate actuator 64. The actuators 64 have arms 65 that drive the pinch plates 26 for linear reciprocation between an open position wherein the leading faces 62 are spaced from each other, and a closed position where the leading faces 62 are moved into the position shown in FIGS. 3 and 4, so that material surrounding the opening in the fuel tank material left by the blow pin 22 is pinched or clamped between the leading faces 62 to close and seal the fuel tank opening. The pinching step is preferably performed while the material of the molded article is semi-solid and capable of flowing easily to form a seam. In one preferred form, a molded article comprising polyethylene would be maintained at a temperature ranging from 70° to 80° C. to allow for sufficient flow of material to form the seam.

The actuators 64 may be any suitable type, for example without limitation, hydraulic or pneumatic cylinders or servo controlled motors. The leading faces 62 of the pinch plates 26 may be generally serrated or undulated to improve and strengthen the seal created when the opening is closed and form a non-linear seam. The non-linear seam provides a longer effective length of the seam to accommodate the circumference of the hole left by the blow pin, to limit or reduce formation of folds or pockets in the seam. This may also improve the barrier properties of the fuel tank in the area of the seam. As best shown in FIG. 3, the leading faces 62 may be provided on separate plates 67 attached to the main pinch plates 26, or the faces 62 may be integral with the pinch plates 26 that are driven by the actuators 64. Preferably, the trim blades 34 are carried by and beneath the pinch plates 26 to further pinch material outboard of the seam formed by the pinch plates and thereby facilitate flash removal, or to shear off the flash.

Preferably, the pinch plate assembly 25 includes a guide plate 68 positioned beneath the pinch plates 26 so the pinch plates 26 are received between the mold 12 and guide plate 68. The guide plate 68 may guide and support the pinch plates 26 as they move between their open and closed positions.

Figure 5:
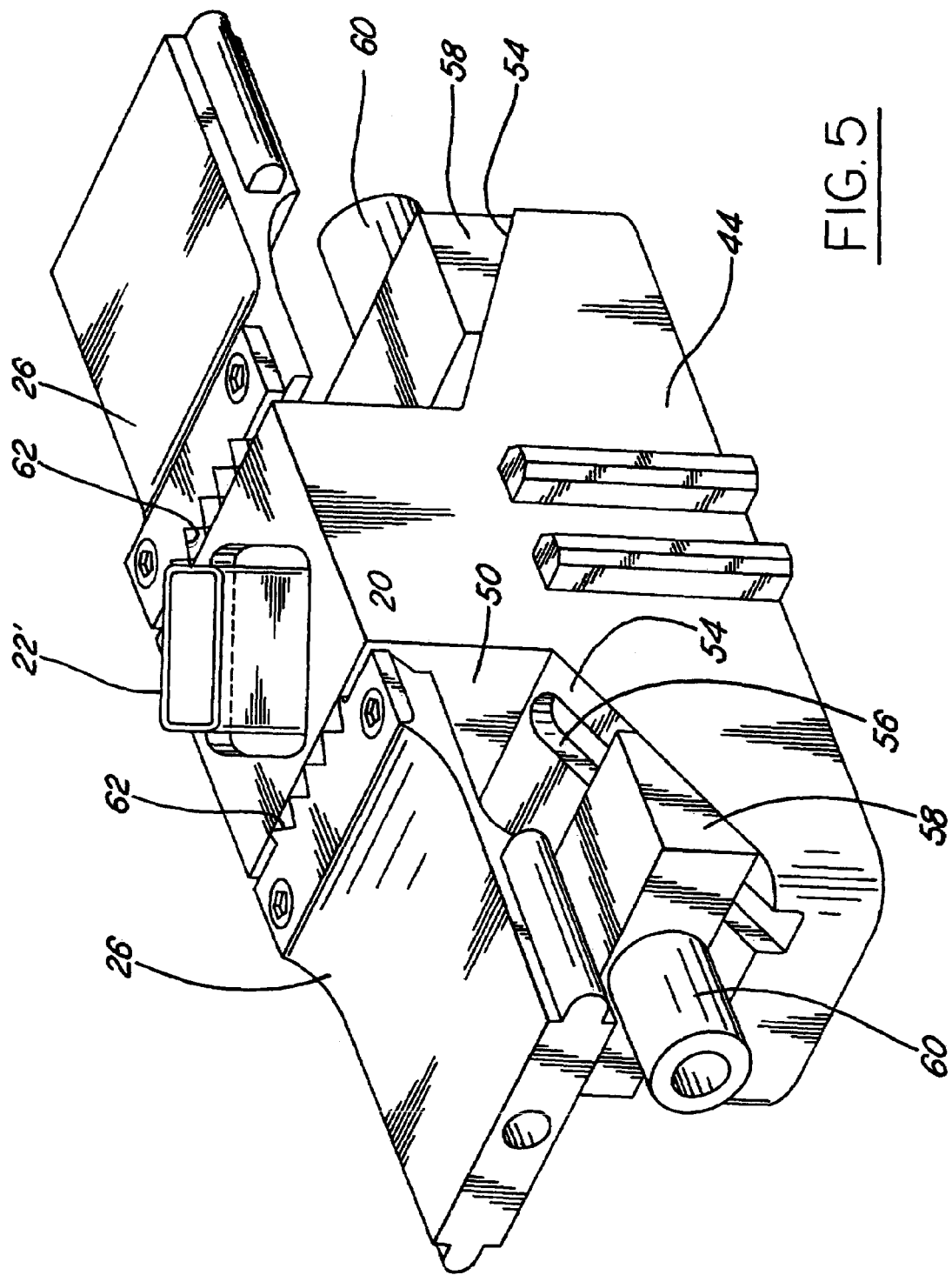
FIG. 5 is a partial perspective view of an alternate embodiment blow molding apparatus showing a modified blow pin guide.

According to another presently preferred embodiment of a blow molding apparatus, as shown in FIG. 5, a blow pin 22' is preferably diamond shaped in cross-section and thereby leaves a diamond-shaped opening in a fuel tank when the blow pin 22' is removed from the blown parison or molded tank material. The diamond-shaped blow pin 22' and corresponding hole formed in the fuel tank material may facilitate or improve pinching and closing the hole in a uniform manner without creating folds and pockets within the fuel tank material, resulting in a seam having improved barrier properties with a more uniform barrier layer in the fuel tank material.

The invention claimed is:

1. An apparatus for blow molding a fuel tank, comprising:
   a mold defining a mold cavity and having an opening communicating with the mold cavity;
   a blow pin through which a pressurized gas may flow, the blow pin being movable between an extended position received at least in part in the opening in the mold and communicating with the mold cavity and a retracted position removed from the mold cavity;
   a blow pin assembly associated with the mold and including the blow pin, a blow pin guide movable relative to the mold between first and second positions and having a passage in which the blow pin is received for reciprocation between its extended and retracted positions, and at least one actuator which moves the blow pin guide; and a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed.

2. The apparatus of claim 1 which also comprises an arm driven for linear reciprocation by the actuator to move the blow pin guide between its first and second positions.

3. The apparatus of claim 2 which also comprises a block carried by the arm and wherein the blow pin guide has a ramp surface along which the block travels as the arm is reciprocated so that as the block is moved with the arm in at least one direction it provides a force acting on the ramp surface to move the blow pin guide.

4. The apparatus of claim 2 wherein the when the arm is moved so that the block travels upwardly on the ramp surface a force is provided acting on the blow pin guide to move it downwardly.

5. An apparatus for blow molding a fuel tank, comprising:
a mold defining a mold cavity and having an opening communicating with the mold cavity:
a blow pin through which a pressurized gas may flow, the blow pin being movable between an extended position received at least in part in the opening in the mold and communicating with the mold cavity and a retracted position removed from the mold cavity; and
a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed, and
wherein the blow pin is diamond shaped in cross section.

6. The apparatus of claim 1 wherein the blow pin guide has a neck disposed at least in part between the pinch plates when the blow pin guide is in its first position to prevent the pinch plates from moving to their closed position when the blow pin guide is in its first position.

7. An apparatus for blow molding a fuel tank, comprising:
a mold defining a mold cavity and having an opening communicating with the mold cavity;
a blow pin through which a pressurized gas may flow, the blow pin being movable between an extended position received at least in part in the mold cavity and communicating with the mold cavity and a retracted position removed from the mold cavity; and
a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed, and a portion of the blow pin when in its extended position is disposed in the path of movement of the pinch plate assembly and when in its retracted position, is out of the path of movement of the pinch plate assembly;
wherein the pinch plate assembly includes at least one trim blade adapted to engage flash outboard of the seam created by the pinch plate assembly.

8. An apparatus for blow molding a fuel tank, comprising:
a mold defining a mold cavity and having an opening communicating with the mold cavity;
a blow pin through which a pressurized gas may flow, the blow pin being movable between an extended position received at least in part in the mold cavity and communicating with the mold cavity and a retracted position removed from the mold cavity; and
a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed, and a portion of the blow pin when in its extended position is disposed in the path of movement of the pinch plate assembly and when in its retracted position, is out of the path of movement of the pinch plate assembly;
wherein the pinch plate assembly includes a pair of pinch plates having generally opposed leading faces and being movable from an open position with the leading faces spaced from each other to a closed position wherein the leading faces are closer together than in the open position so that the leading faces engage and seam fuel tank material as the pinch plates are moved toward the closed position;
wherein the pinch plate assembly includes at least one trim blade carried by a pinch plate to engage flash outboard of the seam created by the pinch plate assembly.

9. An apparatus for blow molding a fuel tank, comprising:
a mold defining a mold cavity and having an opening communicating with the mold cavity;
a blow pin through which a pressurized gas may flow, the blow pin being movable between an extended position received at least in part in the opening in the mold and communicating with the mold cavity and a retracted position removed from the mold cavity;
a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed; and
a carrier arm received at least in part in the blow pin and being movable between an extended position received at least in part in the mold cavity and a retracted position removed from the mold cavity.

10. An apparatus for blow molding a fuel tank, comprising:
a mold defining a mold cavity and having an opening communicating with the mold cavity;
a blow pin through which a pressurized gas may flow, the blow pin being movable between an extended position received at least in part in the mold cavity and communicating with the mold cavity and a retracted position removed from the mold cavity; and
a pinch plate assembly movable between an open position spaced from the opening of the mold and a closed position adapted to engage fuel tank material in the area of the opening and close the material on itself forming a seam, whereby an opening in a blow molded fuel tank, created by the blow pin during the blow molding process, is closed, and a portion of the blow pin when in its extended position is disposed in the path of movement of the pinch plate assembly and when in its retracted position, is out of the path of movement of the pinch plate assembly;

wherein the pinch plate assembly includes a pair of pinch plates having generally opposed leading faces and being movable from an open position with the leading faces spaced from each other to a closed position wherein the leading faces are closer together than in the open position so that the leading faces engage and seam fuel tank material as the pinch plates are moved toward the closed position;

wherein the pinch plate assembly includes a guide plate spaced from the mold and adapted to guide the movement of and support the pinch plates.

11. The apparatus of claim 9 wherein the carrier arm is adapted to releasably carry a component so that the component may be inserted into the fuel tank prior to closing the opening in the fuel tank.

12. The apparatus of claim 5 wherein a diagonal of the diamond shaped blow pin is parallel with the mold parting line.

* * * * *